(12) United States Patent
Levin et al.

(10) Patent No.: US 9,485,209 B2
(45) Date of Patent: Nov. 1, 2016

(54) MARKING OF UNFAMILIAR OR AMBIGUOUS EXPRESSIONS IN ELECTRONIC MESSAGES

(71) Applicant: International Business Machines Corporation, Armonk, NY (US)

(72) Inventors: Roy Levin, Zihron Yacov (IL); Michal Jacovi, Rakefet (IL)

(73) Assignee: International Business Machines Corporation, Armonk, NY (US)

(*) Notice: Subject to any disclaimer, the term of this patent is extended or adjusted under 35 U.S.C. 154(b) by 137 days.

(21) Appl. No.: 14/215,089

(22) Filed: Mar. 17, 2014

(65) Prior Publication Data

US 2015/0263999 A1    Sep. 17, 2015

(51) Int. Cl.
G06F 13/00 (2006.01)
H04L 12/58 (2006.01)
G06F 17/27 (2006.01)

(52) U.S. Cl.
CPC ........... H04L 51/32 (2013.01); G06F 17/2785 (2013.01); H04L 51/063 (2013.01)

(58) Field of Classification Search
CPC ... G06Q 10/107; H04L 12/585; H04L 12/58; H04L 12/581; H04L 12/5855; H04L 51/32; H04L 51/063; G06F 17/2785; G06F 17/274; G06F 17/271; G06F 17/277; G06F 17/2755

USPC .............................................. 704/9; 709/206
See application file for complete search history.

(56) References Cited

U.S. PATENT DOCUMENTS

| 7,827,165 B2 | 11/2010 | Abernethy, Jr. et al. |
| 7,933,960 B2 | 4/2011 | Chen et al. |
| 2004/0193557 A1* | 9/2004 | Olsen .................... G06F 17/274 706/1 |
| 2010/0114887 A1 | 5/2010 | Conway et al. |
| 2010/0169769 A1* | 7/2010 | Jimenez et al. ..... G06Q 10/107 715/259 |
| 2013/0253910 A1* | 9/2013 | Turner et al. ......... G06F 17/274 704/9 |

FOREIGN PATENT DOCUMENTS

JP    2013511768    4/2013

* cited by examiner

*Primary Examiner* — Robert B Harrell

(57) ABSTRACT

A method comprising using at least one hardware processor for constructing an index of corpora of multiple users, wherein each corpus of said corpora is associated with a single user of said multiple users, analyzing an electronic message addressed at least to one of said multiple users, to identify an expression which, based on the index, is likely to be unfamiliar or ambiguous to said one of the multiple users, and marking the expression in the electronic message.

20 Claims, 3 Drawing Sheets

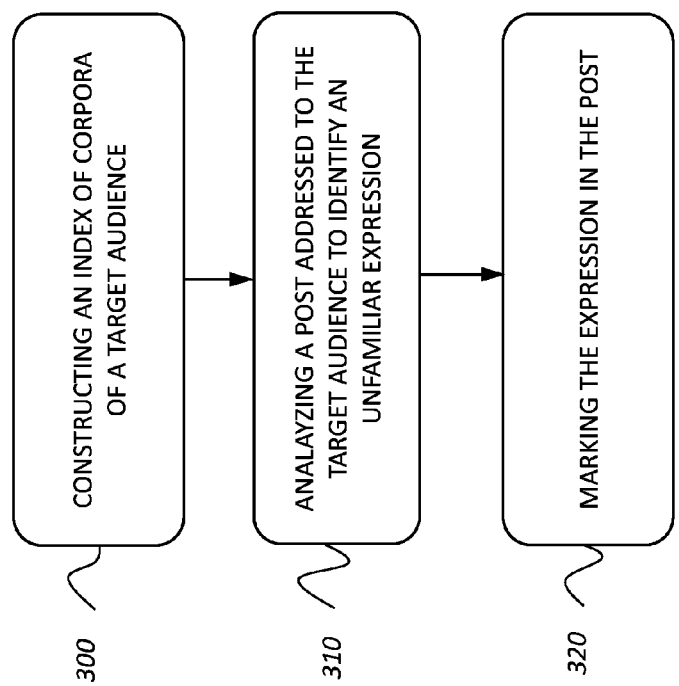

MARKING OF UNFAMILIAR OR AMBIGUOUS EXPRESSIONS IN ELECTRONIC MESSAGES

BACKGROUND

The present invention relates to the field of social analytics.

When people interact electronically (e.g., via email, instant messaging, etc.) within an organization, through a social network or via Internet platforms such as blogs or forums, it is often difficult to follow the different acronyms, abbreviations and names of people that are used. That is, because the terms, for example, may have a meaning only within the social context they are used. In many of these media, there is often a content originator (e.g. a person sending out an email) and multiple recipients. For example, in large organizations, there are often projects that require collaboration between many teams. In such cases, when a person is mentioned, she is often referred to on a first name basis. This makes it difficult for many email recipients to know who is being referred and what exactly their role in the project is. In such cases, the content originator may be unaware which terms are known to the recipients and which are not.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method comprising using at least one hardware processor for: constructing an index of corpora of multiple users, wherein each corpus of said corpora is associated with a single user of said multiple users; analyzing an electronic message addressed at least to one of said multiple users, to identify an expression which, based on the index, is likely to be unfamiliar or ambiguous to said one of the multiple users; and marking the expression in the electronic message.

There is further provided, in accordance with an embodiment, a computer program product comprising a non-transitory computer-readable storage medium having program code embodied therewith, the program code executable by at least one hardware processor to: construct an index of corpora of multiple users, wherein each corpus of said corpora is associated with a single user of said multiple users; analyze an electronic message addressed at least to one of said multiple users, to identify an expression which, based on the index, is likely to be unfamiliar or ambiguous to said one of the multiple users; and mark the expression in the electronic message.

There is yet further provided, in accordance with an embodiment, a method comprising using at least one hardware processor for: constructing an index of corpora of a target audience, wherein said corpora comprises data reflecting knowledge ascribed to the target audience; analyzing a post addressed to said target audience, to identify an expression which, based on the index, is likely to be unfamiliar or ambiguous to said target audience; and marking the expression in the post.

In some embodiments, the corpora comprise social network data.

In some embodiments, the corpora comprise enterprise network data.

In some embodiments, the expression is missing from the corpus associated with said one of the multiple users.

In some embodiments, the constructing of the index comprises semantically analyzing said corpora.

In some embodiments, the electronic message is composed by a composer being part of said multiple users; and said expression is semantically different in the corpus associated with said one of the multiple users and in the corpus associated with said composer.

In some embodiments, the electronic message is composed by a composer being part of said multiple users; and said expression is less predominant in the corpus associated with said one of the multiple users than in the corpus associated with said composer.

In some embodiments, the analyzing is performed gradually, based on a linguistic predisposition of expressions to be jargon.

In some embodiments, the method further comprises displaying a proposed interpretation of the expression, and inserting the proposed interpretation into the electronic message based on a confirmation by a composer of the electronic message.

In some embodiments, the method further comprises marking, in an addressee field of the electronic message, a name of said one of said multiple users, wherein said marking is visually similar to the marking of the expression.

In some embodiments, the method further comprises displaying evidence based on which it is likely that the expression is unfamiliar or ambiguous to said one of the multiple users.

In some embodiments, the electronic message is selected from the group consisting of: an electronic mail (email) and an instant message.

In some embodiments, the program code is further executable by the at least one hardware processor to display a proposed interpretation of the expression, and insert the proposed interpretation into the electronic message based on a confirmation by a composer of the electronic message.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIG. 3 shows a flow chart of another method constructed and operative in accordance with the disclosed technique.

DETAILED DESCRIPTION

The terms "corpora" (plural) and "corpus" (singular), as referred to herein, may relate to sets of text stored electronically.

The term "expression", as referred to herein, may relate to one or more words, a sentence, initials, abbreviations, aliases, names or a combination thereof.

The term "jargon", as used herein, may relate to a nomenclature which is especially defined in relationship to a specific activity, profession, group, event and/or the like. Examples include medical jargon, legal jargon, basketball jargon, etc. Each such jargon may include multiple words and/or expressions. Furthermore, the term "jargon" may relate to a person's name, which is not complete enough in order to uniquely identify that person outside of a certain social circle (e.g. a circle of friends, family, professional colleagues, etc.).

Figure 1:
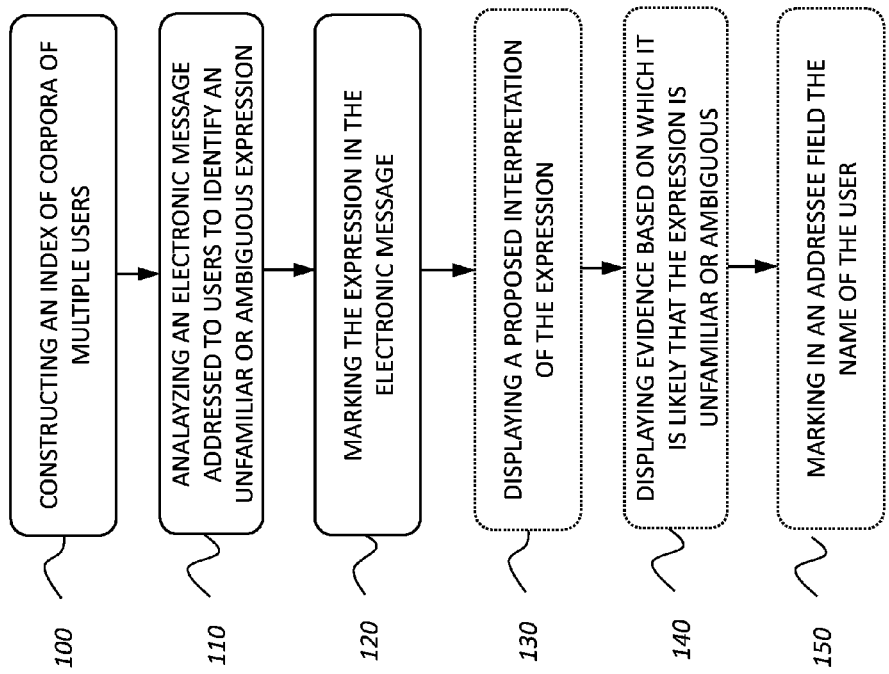
FIG. 1 shows a flow chart of a method constructed and operative in accordance with the disclosed technique.
Figure 2:
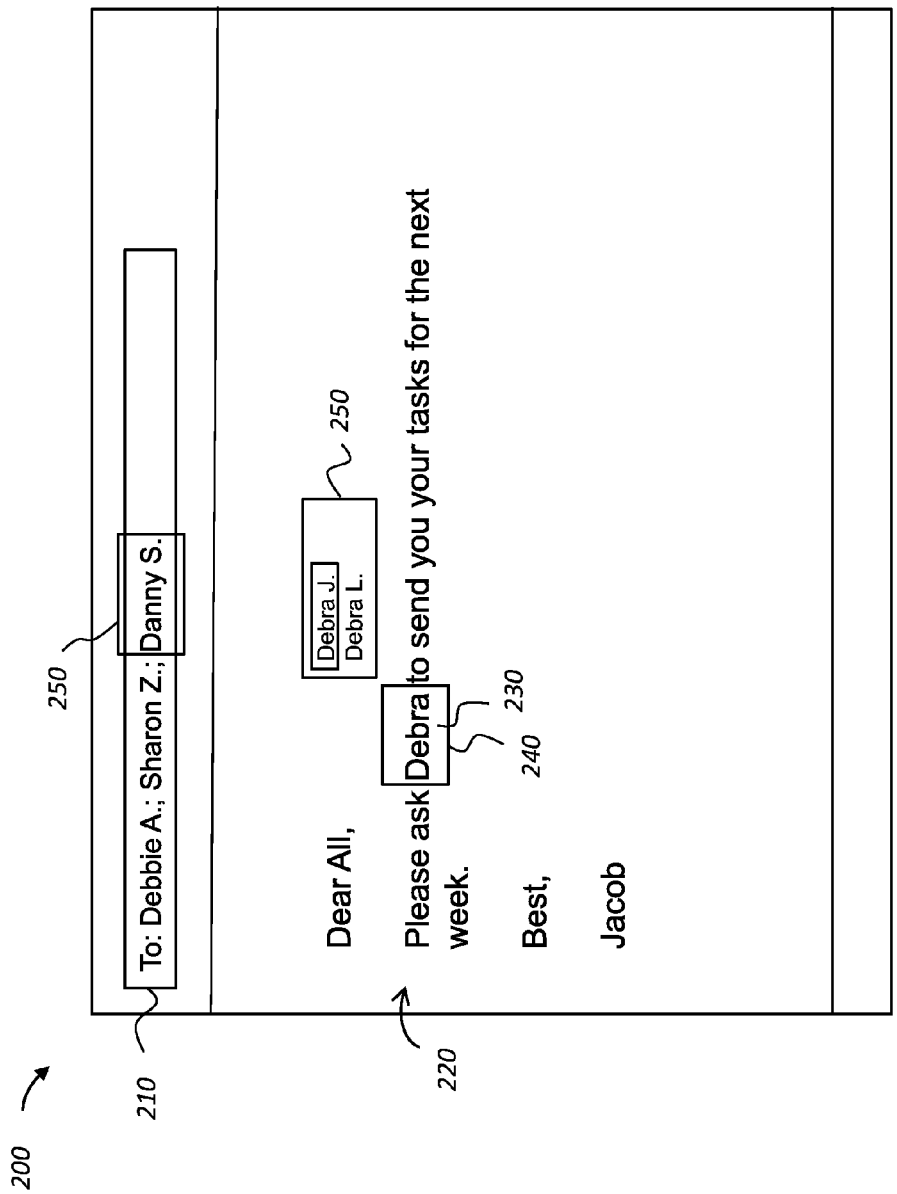
FIG. 2 shows a schematic illustration of a display of an exemplary marked electronic message in accordance with the method of FIG. 1.

The disclosed methods and computer program products may allow for efficient, accurate and clear communication between people. Reference is now made to FIG. 1 and FIG. 2. FIG. 1 shows a flow chart of a method constructed and operative in accordance with the disclosed technique. FIG. 2 shows a schematic illustration of a display 200 of an exemplary marked electronic message in accordance with the method of FIG. 1.

In a step 100, an index of corpora of multiple users may be constructed. Each corpus of the corpora may be associated with a single user. Each corpus may include content generated by or associated to a user, such as social network data (e.g., LinkedIn or Facebook), enterprise network data, etc. The corpora may include data, such as documents, fetched from such one or more networks or may include these networks. The data may be fetched by scraping websites (i.e., by using known scraping methods and tools) and/or by using public APIs of such websites in order to fetch the data in a more structured manner.

By 'index' it is meant, for example, an inverted index, as known in the art, but other types of indices are also intended herein. The index may store a mapping from content to its location in the corpora, for example in the form of hash tables or binary trees. The index may be used to allow fast full text searches within the corpora. The index may be constantly updated following changes made to the content of the corpora. In some embodiments, a score may be set to denote the level of association between each document or datum and each relevant user. A relevant user with respect to a document may be a user which had some interaction with the document, such as a user who wrote the document, edited the document, read the document and/or indicated that he liked the document. Thus a document may be associated with multiple scores, each relating to a relevant user. Higher scores may be ascribed to documents with respect to users which generated these documents, as opposed to users who just read these documents. Hence, the degree of relatedness between a document and a user may be expressed by score.

In a step 110, an electronic message addressed at least to one user of the multiple users may be analyzed to identify an expression which, based on the index, is likely to be unfamiliar or ambiguous to this user. The electronic message may be generated in a messaging client installed on a computer. The electronic message may be, for example, an electronic mail (email) generated in an email client or an instant message generated in an instant messaging client. The computer may be a personal computer, a mobile phone, a laptop, a tablet computer, a personal digital assistant, etc. The analysis may be performed by the messaging client (i.e., as an inherent function) or may be performed by an add-on to the messaging client installed on the computer. Various methods may be used to check the association between an expression and a recipient user, such as term frequency-inverse document frequency (TF-IDF) or Kullback-Leibler divergence (KL-Divergence). In some embodiments, an association score may be determined between an expression and a user. The determination of the association score may be based, for example, on the scores associated to documents in which the expression appears and relating to the user. If the association score is below a determined threshold, then the expression may be identified as unfamiliar to the user. For example, a search query may be issued for each expression that appears in the electronic message with respect to a user (e.g., email recipient) in the index. The relevant scores (i.e., relating to the user) which are associated with the received documents may be then aggregated. If such aggregated score relating to a user is below a predefined threshold then the expression may be deemed as unfamiliar to the user. In such a case the email composer may be notified accordingly.

In some embodiments, the analysis of the electronic message may be performed gradually (e.g., in an iterative manner), based on a linguistic predisposition of expressions to be jargon. For example, initials, nouns and/or words beginning with a capital letter may have a greater linguistic predisposition to be jargon as opposed to, for example, conjunctions or verbs. Optionally, the expression may be identified as likely to be unfamiliar or ambiguous to a user if the expression is missing from the corpus associated with the user. Optionally, the expression may be identified as likely to be unfamiliar or ambiguous to a user if the expression appears in the corpus associated with the user with a low frequency (e.g., below a predefined threshold).

In some embodiments, the electronic message may be composed by a composer who is a part of the multiple users. In such cases, an expression may be identified as likely to be unfamiliar or ambiguous to an addressed user if it is semantically different in the corpus associated with the addressed user and in the corpus associated with the composer. Optionally, an expression may be identified as likely to be unfamiliar or ambiguous to an addressed user if it may be less predominant in the corpus associated with the addressed user than in the corpus associated with the composer. In some embodiments, a dictionary of words may be generated for each user, which may include words included in the corpus of the user. The words may be rated according to their predominance in the corpus. The dictionary may further include the context in which the word appears in the corpus. If an expression is predominant in the corpuses of an addressed user and the composer to the same extent then the association of the expression in the corpuses may be reviewed. If the association of the expression in the corpuses is different, then the expression may be identified as ambiguous.

With reference to FIG. 2, a display 200 of an exemplary email message including a recipients field 210 and a message body 220 is shown. The email message is written by a composer, named Jacob, and addressed to three users: Debbie A., Sharon Z. and Danny S. The email message may be analyzed and an expression 230, "Debra" may be identified as likely to be unfamiliar or ambiguous to at least one of the addressed users. The expression is a first name only and therefore may be ambiguous to an addressed user which is found to be familiar with at least two people having the same first name (e.g., the names were found in his corpus).

In a step 120, the expression in the electronic message may be marked. The marking may be performed, for example, by displaying the expression in bold, underline it, highlight it in some color and/or change its font color.

In an optional step 130, a proposed interpretation of the expression may be displayed (e.g. as a tooltip) and inserted into the electronic message based on a confirmation by the composer of the electronic message. The interpretation may be aimed at explaining or clarifying the unfamiliar or ambiguous expression to a user. For example, an interpretation may include the meaning of initials or the name of a person behind an alias. In case there may be several optional interpretations, they may be displayed for the composer, which may, in turn, select the correct one. Once the composer selects a proposed interpretation, it may be inserted into the electronic message (e.g., replacing the expression or in addition to it). The interpretation may be automatically displayed or may be displayed upon the composer's request, for example, by clicking a button activating such feature. The interpretation may be displayed once the composer hovers with a pointing device over the expression or over the addressed user which the interpretation relates to. Alternatively, the composer may add interpretation of its own or replace the marked expression.

In an optional step 140, evidence based on which it is likely that the expression is unfamiliar or ambiguous to the one of the multiple users, may be displayed. For example, if a user is considered as unfamiliar with an expression because it is missing from his corpus, then an indication of that may be displayed to the composer (e.g., a text stating that: "Expression X is not found in the network of user Y"). The evidence may be automatically displayed or may be displayed upon the composer's request, for example, by clicking a button activating such feature. The evidence may be displayed once the composer hovers with a pointing device over the expression or over the addressed user to which the evidence relates to.

In an optional step 150, a name of one of the addressed users may be marked in an addressee field of the electronic message. The marked user (or users) may be a user which is likely to be unfamiliar with the marked expression or the marked expression is likely to be ambiguous to this user. The marking may be visually similar to the marking of the expression. Thus, for example, several expressions may be marked in several different colors and the one or more users which are likely to be unfamiliar with a marked expression or the marked expression may be ambiguous to them, may be marked in the same color as the expression.

In some embodiments, a link with respect to the marked expression may be displayed. Such link may include a definition of the expression (e.g., a link to of the expression or a link to explanatory images) or a profile of a person, in case the expression relates to a person (e.g., a link to the person's website, profile page in a social network etc.). Alternatively, the expression may be turned into a link to such data sources relating to the expression. The link may provide explanatory or additional relevant information to the composer to assist him in phrasing an efficient and clear message. Such link may become a part of the message to be sent to the recipients in order to provide the recipients with explanatory or additional relevant information with respect to the message.

With reference to FIG. 2, expression 230 may be marked by a square mark 240 which frames expression 230. An interpretation display 240 may include a proposed interpretation to ambiguous expression 230, i.e., the full name of people found in at least a corpus of one of the addressed users having the first name "Debra". Thus, interpretation display 240 includes two full names of women having a first name "Debra". Furthermore, since these women were found in the corpus associated with the addressed user "Danny S.", and therefore he is the user which expression 230 may be likely ambiguous to, Danny S. may be marked in recipients' field 210 by a square mark 250. Thus, square mark 250 is visually similar to square mark 230.

FIG. 3 shows a flow chart of another method constructed and operative in accordance with the disclosed technique. The method of FIG. 3 is similar to the method of FIG. 1 and may be implemented in a similar manner with respect to the below detailed modifications.

In a step 300, an index of corpora of a target audience may be constructed. The corpora may include data reflecting knowledge which may be ascribed to the target audience. The target audience may be, for example, children, seniors, members of a specific scientific community, people interested in baking etc. The corpora may include data reflecting knowledge which is likely to be in the possession of the average individual being part of the target audience. Thus, for example, seniors may have knowledge in music of the 60's, but may lack knowledge in hip music or people interested in baking may lack knowledge in cooking.

The corpora may be constructed based on data collected with respect to specific people known to be part of the target audience (e.g., profiles or posts of subscribers of a blog or members of a forum in which the post is published). As another option, if the target users are a group which interacts using a certain web site dedicated to that group, than the corpora may be the textual contents of that web site (which may include messages exchanged between members of the group).

In a step 310, a post (i.e. an electronic message intended to be published in a central location accessible to the target audience) addressed to the target audience may be analyzed to identify an expression which, based on the index, is likely to be unfamiliar or ambiguous to the target audience. For example, a name of a contemporary band may be identified as likely to be unfamiliar to seniors.

In a step 320, the expression may be marked in the post. The mark may indicate the posting individual that the marked expression is likely to be unfamiliar or ambiguous to the average individual being part of the target audience.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method that operates at least one hardware processor for:
   receiving a plurality of electronic text documents, each associated with at least one of a plurality of specific recipient users;
   constructing an index of said plurality of electronic text documents, wherein said index comprises a mapping between (a) word expressions in said plurality of electronic text documents and (b) said specific recipient users; and
   providing access to said index to a messaging client of a sending user, for:
      analyzing an electronic message that is rendered by said messaging client on a computer display of said sending user, wherein said electronic message is composed by said sending user and addressed to at least one message recipient of said specific recipient users, wherein said analyzing identifies a new word expression that, based on the index, is likely to be unfamiliar or ambiguous to said at least one message recipient, and marking the new word expression in the electronic message and rendering the marking on said computer display of said sending user, wherein said marking further indicates who is the at least one message recipient to whom the new word expression is likely to be unfamiliar or ambiguous.

2. The method according to claim 1, wherein said electronic text documents comprise social network data.

3. The method according to claim 1, wherein said electronic text documents comprise enterprise network data.

4. The method according to claim 1, wherein said new word expression is missing from the electronic text documents associated with said at least one message recipient.

5. The method according to claim 1, wherein said constructing of the index comprises semantically analyzing said electronic text documents.

6. The method according to claim 1, wherein
said new word expression is semantically different in the electronic text documents associated with said at least one message recipient and in the electronic text documents associated with said sending user.

7. The method according to claim 1, wherein
said new word expression is less predominant in the electronic text documents associated with said at least one message recipient than in the electronic text documents associated with said sending user.

8. The method according to claim 1, wherein said analyzing is performed gradually, based on a linguistic predisposition of expressions to be jargon.

9. The method according to claim 1, further comprising displaying a proposed interpretation of the new word expression, and inserting the proposed interpretation into the electronic message based on a confirmation by said sending user.

10. The method according to claim 1, wherein the indication of who is the at least one message recipient to whom the new word expression is likely to be unfamiliar or ambiguous comprises marking, in an addressee field of the electronic message, a name of said at least one message recipient, wherein said marking in the addressee field is visually similar to the marking of the new word expression in the electronic message.

11. The method according to claim 1, further comprising displaying evidence based on which it is likely that the new word expression is unfamiliar or ambiguous to said at least one message recipient.

12. The method according to claim 1, wherein said electronic message is selected from the group consisting of: an electronic mail (email) and an instant message.

13. A computer program product comprising a non-transitory computer-readable storage medium having program code embodied therewith, the program code executable by at least one hardware processor to:
receive a plurality of electronic text documents, each associated with at least one of a plurality of specific recipient users;
construct an index of said plurality of electronic text documents, wherein said index comprises a mapping between (a) word expressions in said plurality of electronic text documents and (b) said specific recipient users; and
provide access to said index to a messaging client of a sending user, for:
analyzing an electronic message that is rendered by said messaging client on a computer display of said sending user, wherein said electronic message is composed by said sending user and addressed to at least one message recipient of said users, wherein said analyzing identifies a new word expression that, based on the index, is likely to be unfamiliar or ambiguous to said at least one message recipient, and
marking the new word expression in the electronic message and rendering the marking on said computer display of said sending user, wherein said marking further indicates who is the at least one message recipient to whom the new word expression is likely to be unfamiliar or ambiguous.

14. The computer program product according to claim 13, wherein said electronic text documents comprise social network data.

15. The computer program product according to claim 13, wherein said electronic text documents comprise enterprise network data.

16. The computer program product according to claim 13, wherein said construction of the index comprises semantically analyzing said electronic text documents.

17. The computer program product according to claim 13, wherein
said new word expression is semantically different in the electronic text documents associated with said at least one message recipient and in the electronic text documents associated with said sending user.

18. The computer program product according to claim 13, wherein
said new word expression is less predominant in the electronic text documents associated with said at least one message recipient than in the electronic text documents associated with said sending user.

19. The computer program product according to claim 13, wherein the program code is further executable by the at least one hardware processor to display a proposed interpretation of the new word expression, and insert the proposed interpretation into the electronic message based on a confirmation by said sending user.

20. A computer-implemented method that operates at least one hardware processor for:
analyzing an electronic message that is rendered by a messaging client on a display connected to said at least one hardware processor, wherein said electronic message is composed by a sending user of multiple users and addressed to at least one receiving user message recipient of a plurality of specific recipient users, wherein said analyzing identifies a new word expression that, based on an index, is likely to be unfamiliar or ambiguous to said at least one message recipient; and
marking the new word expression in the electronic message and rendering the marking on said display,
wherein said marking indicates who is the at least one message recipient to whom the new word expression is likely to be unfamiliar or ambiguous,
wherein said index comprises a mapping between (a) word expressions in a plurality of electronic text documents, each associated with at least one of said plurality of specific recipient users, and (b) said plurality of specific recipient users, and
wherein said index is accessed by said messaging client.

* * * * *